United States Patent

[11] 3,628,934

| [72] | Inventor | Jean Duthoit |
| | | Gilly, Belgium |
| [21] | Appl. No. | 723,380 |
| [22] | Filed | Apr. 23, 1968 |
| [45] | Patented | Dec. 21, 1971 |
| [73] | Assignee | Glaverbel S.A. |
| | | Watermael, Boitsfort, Belgium |
| [32] | Priority | Apr. 28, 1967 |
| [33] | | Luxembourg |
| [31] | | 53,555 |

[54] TEMPERATURE CONTROL OF CHEMICAL TEMPERING OF SOLID GLASS OR VITROCRYSTALLINE BODIES
11 Claims, 2 Drawing Figs.

[52] U.S. Cl. .................................................. 65/30, 65/60, 65/114, 117/124
[51] Int. Cl. .................................................. C03c 21/00
[50] Field of Search .................................................. 65/30, 60, 114; 117/124

[56] References Cited
UNITED STATES PATENTS

| 3,393,987 | 7/1968 | Plumat | 65/30 X |
| 3,396,075 | 8/1968 | Morris | 65/30 X |
| 3,428,513 | 2/1969 | Denman | 65/30 X |
| 3,467,508 | 9/1969 | Loukes et al. | 65/30 |
| 3,505,047 | 4/1970 | Plumat | 65/30 |

*Primary Examiner*—S. Leon Bashore
*Assistant Examiner*—John H. Harman
*Attorney*—Spencer & Kaye

ABSTRACT: A process and apparatus for improving the properties of materials which are chemically tempered by means of an ion diffusion process, the improvement being obtained by decreasing the temperature at which the process is carried out during the course of the ion diffusion operation, by at least 40° C.

HEAT EXCHANGERS

INVENTOR
Jean Duthoit

BY Spencer & Kaye
ATTORNEYS.

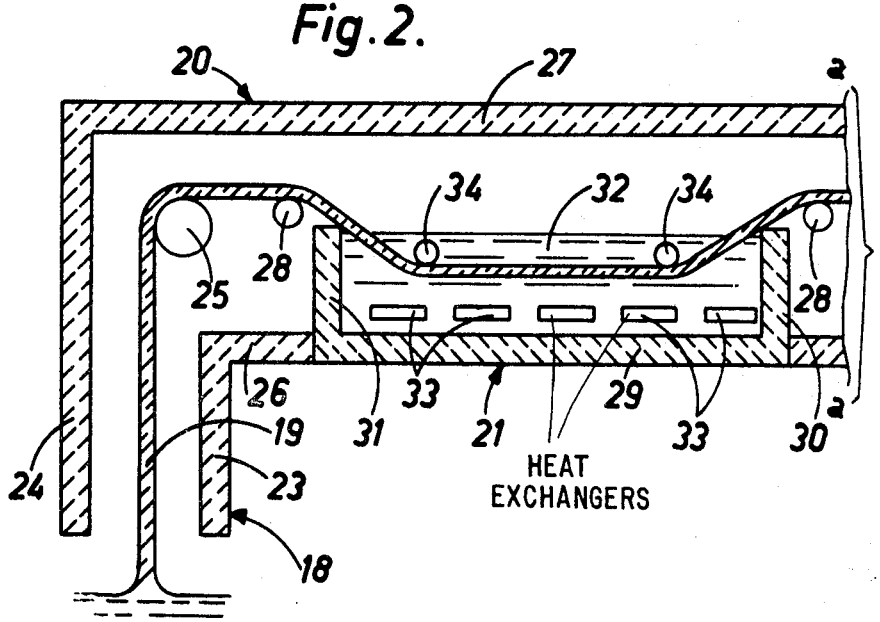

3,628,934

TEMPERATURE CONTROL OF CHEMICAL TEMPERING OF SOLID GLASS OR VITROCRYSTALLINE BODIES

BACKGROUND OF THE INVENTION

The present invention relates to a process for tempering vitreous or vitrocrystalline bodies.

It is known that metal ions can be caused to diffuse into glass from a contacting medium in exchange for other ions from the glass. If the nature of the ions entering the glass and the temperature conditions existing during the ion exchange are appropriately chosen, the ion exchange causes the production of, or an increase in, compressive stresses in exterior layers of the glass. In other words, the glass is chemically tempered.

Two general types of process for chemically tempering glass are known per se. In one type of process (referred to hereinafter as the "high-temperature type"), an ion exchange takes place at a temperature sufficiently high for stress relaxation to occur in the glass, and the ions entering the glass are such as to confer a reduced coefficient of thermal expansion on the external glass layers. In the other type of process (referred to hereinafter as "the low-temperature type"), ions in exterior layers of the glass are replaced by larger ions, and the ion exchange is effected while the exterior glass layers are at a temperature below the annealing point (corresponding to a viscosity of $10^{13.2}$ poises), so that stress relaxation will not occur, or will occur only to a minor extent.

It has been found that these chemical tempering processes present certain serious disadvantages. For example, the objects thus tempered are susceptible to damage as a result of chemical attack, for example by water. It results that after a certain period of exposure to varying weather conditions and the impurities present in the air, such objects are subject to the phenomenon known as "staining." Moreover, it has been observed that the improvements imparted to the physical properties of the objects by such chemical tempering treatments are partially nullified by aging.

SUMMARY OF THE INVENTION

It is a primary object of the present invention to substantially reduce these drawbacks.

Another object of the invention is to improve the physical properties of chemically tempered materials.

A more specific object of the invention is to improve the mechanical strength of chemically tempered glass.

The present invention is based on my discovery that the results achieved by any process of either of the two above-mentioned types will be substantially improved if the temperature of the body being tempered is caused to decrease during the ion exchange period while remaining within the temperature range which is proper for the particular process.

Thus, these and other objects according to the invention are achieved, in a process for increasing the physical strength of a body by subjecting it to a chemical tempering involving the exchange of ions between the body and a communicating diffusion medium while maintaining the temperature of the body within the range suitable for the process, by the improvement composed of decreasing the temperature of the body during the course of the ion exchange operation.

The objects according to the invention are also achieved by the provision of apparatus for physically strengthening bodies by subjecting them to a chemical tempering process involving the exchange of ions between the body and a communicating diffusion medium. The apparatus essentially includes a container for holding a mass of such diffusion medium, conveyor means associated with the container for moving such a body along a path extending through the container as the exchange proceeds, and heat control means associated with the container for maintaining the portion of the interior of the container along which such path extends at a temperature which decreases progressively in the direction of body movement along such path while remaining within the range necessary for effecting the tempering.

BRIEF DESCRIPTION OF THE DRAWINGS

FIG. 2 is a view similar to that of FIG. 1 of another embodiment according to the invention.

DESCRIPTION OF THE PREFERRED EMBODIMENTS

Figure 1:
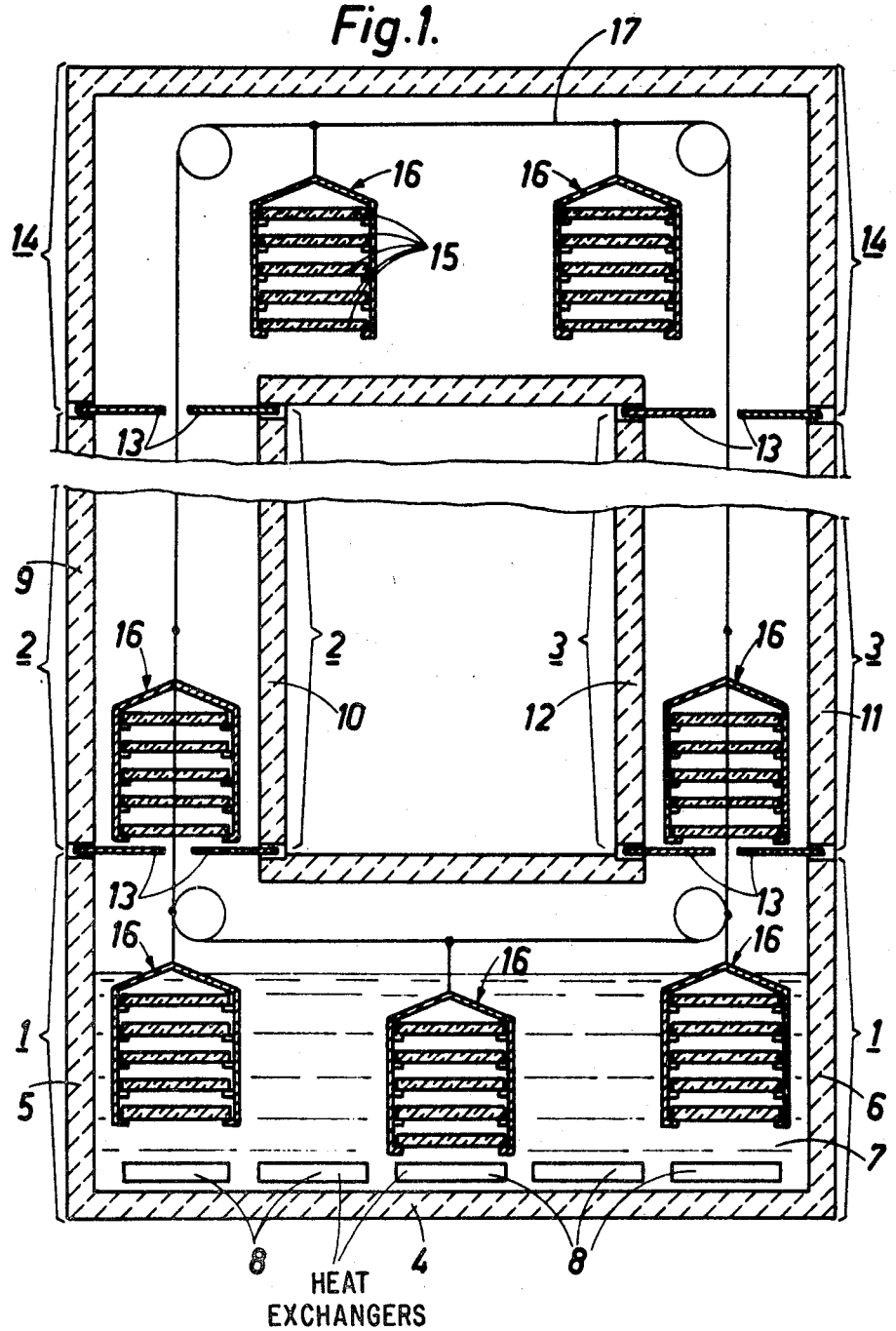
FIG. 1 is an elevational, cross-sectional view of one embodiment of apparatus according to the invention.

In accordance with the present invention, certain properties of a vitreous or vitrocrystalline body are improved by a chemical tempering process which is characterized in that, in the course of the period during which an ion exchange takes place between the body and the diffusion medium in communication therewith, the temperature of the body is progressively reduced while remaining within the temperature range necessary for the tempering process. Thus, in a chemical tempering process of the high-temperature type, the temperature of the body is maintained sufficiently high to assure that stress relaxation will occur while the ions which impart a lower coefficient of thermal expansion are being diffused into the body surface. On the other hand, in carrying out a chemical tempering process of the low-temperature type, the temperature of the body is always maintained below the annealing point.

The invention is particularly well suited for use in the tempering of glass made from ordinary inexpensive constituents such as silica, soda, lime and feldspar. The ion exchange may be an exchange of alkali metal ions and it may, for example, involve the replacement of sodium ions in the glass by lithium ions in the case of a high-temperature process, or by potassium ions in the case of a low-temperature process.

It is an advantage to commence the ion exchange at a temperature which is in the high portion of the permissible temperature range because the higher the temperature, the higher is the coefficient of diffusion of given ions into the glass. However, the effects on the glass, in terms of its physical properties, are improved if the temperature is decreased during the ion exchange process rather than if the initial temperature is maintained throughout the process.

The reason for this improvement is not known with certainty. However, it has been noted that the carrying out of the ion exchange at a temperature which is maintained in the high portion of the permissible temperature range throughout the process appears to lead to an undue buildup at the surface of the material in the concentration of the ions being diffused thereinto, this buildup occurring in a surface layer of between 1 and 30 microns in thickness. These ions are found in spaces normally not occupied by the unsubstituted alkali metal ions of the material.

If the operating temperature is sufficiently decreased during the ion exchange period, this excessive concentration is avoided, or at least reduced, and this appears to contribute to the improved results. The performance of a tempering process according to the invention on glass increases the tensile strength of the glass by an amount which is greater than that which can be obtained by keeping the temperature constant during the entire process, even if the temperature were kept constant at the average value of the temperature range over which the material is varied during a tempering operation according to the invention. The tensile strength imparted to the material also tends to be retained for longer periods when the tempering is performed according to the invention.

It had also been found that in many cases the surface of a piece of glass which was tempered according to the invention has an enhanced chemical resistance to weathering.

When performing a high-temperature-type tempering process, the initial temperature during the ion exchange period is preferably at least as high as 1.05 Tg, where Tg is defined as the transformation temperature, at which the viscosity of the glass is $10^{13.2}$ poises. Thus, the transformation temperature is very close to the annealing point. For a low-temperature-type process the initial temperature is preferably at least 0.6 Tg.

Preferably, the temperature of the glass surface during the period of the ion exchange process is reduced by at least 40°

C. The temperature may be caused to drop considerably more than that, for example by more than 100° C. and by as much as 150° C. or even 200° C. The ion exchange may take place between the glass and a contacting molten medium which constitutes a coating carried by the glass or which constitutes one bath or more baths in which the glass body is immersed. When using a medium in the form of a bath, the glass body can be preheated before contact with the bath to avoid or reduce thermal shock and to reduce the processing time. A medium in the form of a coating can of course also be applied to a preheated glass body. A molten medium can, for example, be composed of a potassium salt, such as potassium nitrate, a lithium salt, such as lithium chloride, or a mixture of substances including a potassium or lithium salt.

When a chemical tempering bath is used, the article to be tempered can be moved progressively through the bath and a temperature gradient can be maintained in the bath so that the required temperature decrease occurs as the article advances. The temperature gradient can be easily maintained by providing a succession of immersion heaters in the bath, and adjusting each heater to provide a different temperature. MOreover, by an appropriate choice of the number, spacing and relative dimensions of the heaters along the path followed by the glass body, the curve of the surface temperature of any part of the body with respect to its location along the path during the ion exchange can be given any predetermined configuration. The speed of movement of the body through the bath can also be varied. When the invention is carried out in this manner, each successive surface portion from the leading to the trailing end of the body is exposed to a temperature which decreases during the ion exchange process.

The use of a chemical tempering bath having a temperature gradient which is such that the temperature decreases in the direction of movement of the article through the bath is particularly useful for tempering a drawn glass ribbon as it moves continuously away from the drawing zone where the glass is at a high temperature. In a Colburn type glass-drawing machine, the drawn glass ribbon passes over a bending roller and then through a lehr in which it is progressively cooled. Tempering by ion exchange according to the invention may take place in such a lehr. Thus, a tempering bath may be provided in the lehr and the ribbon of glass can be guided through this bath so that tempering occurs at a temperature which decreases towards the exit end of the bath.

Tempering according to the invention may occur in each of two or more baths in succession, the successive baths being at successively lower temperatures. When tempering drawn glass, the glass may be cut into pieces between successive treatment baths before the tempering has advanced so far as to make clean cutting difficult.

It has been found that the discovery on which the invention is based is useful also in the chemical tempering of a body of vitrocrystalline material of whatever degree of crystallization. A vitrocrystalline body can be chemically tempered by replacing ions originally present in external layers of the body with ions which confer a lower coefficient of thermal expansion on said external layers while maintaining the body at a temperature which is sufficiently high to permit stress relaxation to occur, or by replacing ions in external layers of the body with larger ions while the layers are at a temperature below the annealing point of the vitreous phase or phases of the body. The indications given hereinbefore relating to the use of the invention in the chemical tempering of glass are generally applicable to the use of the invention in chemically tempering vitrocrystalline materials.

The invention includes apparatus for use in performing a process as hereinbefore defined and composed of a container or basin containing a bath of medium from which ions are to diffuse into the body, means for conveying the body along a path extending into and out of said tank, and means for maintaining a temperature gradient in the bath, the temperature decreasing along the path in the direction of movement of the body.

The conveying means may consist of an endless conveyor carrying racks or other supports for articles to be tempered, or it may consist of rollers suitably arranged for displacing and guiding a continuous ribbon of glass into and out of the one or more tanks.

The apparatus shown in FIG. 1 includes a tank 1, a preheating compartment 2 and a cooling compartment 3. The tank 1, having bottom wall 4 and end walls 5 and 6, contains a bath 7 of molten potassium salt. Within the tank there are heat exchangers 8 which are located near the bottom 4 and through which streams of fluid are circulated to maintain the heat exchangers at temperatures which decrease from the exchanger at the left-hand end to the exchanger at the right-hand end of the tank.

The preheating compartment 2, which is defined in part by lateral walls 9 and 10, is equipped with heating means (not shown) to provide for either slight or considerable preheating of the articles as they pass through this compartment. The cooling compartment 3, which is defined in part by lateral walls 11 and 12, is equipped with coolers (not shown) to provide for either slow or rapid cooling of the articles after they have passed through tank 1.

Between the preheating compartment 2 and tank 1 and between cooling compartment 3 and tank 1 there are gates 13 which open and close as required for the movement of articles to be tempered, as will be described below. Further gates 13 at the top of the preheating and cooling compartments separate these compartments from an upper compartment 14 where thin sheets 15 of glass are loaded onto racks 16 preparatory to tempering and are subsequently removed after tempering. The racks 16 are suspended from an endless conveyor 17 which travels in counterclockwise direction with respect to the plane of the figure.

In a typical operation of the apparatus, glass sheets 15, 2 mm. in thickness, are loaded onto the racks 16 then situated in compartment 14. By the movement of the conveyor 17, the glass sheets are carried through the preheating compartment 2 in which they are heated to a temperature of 500° C. The sheets are subsequently carried into the bath 7 of molten potassium nitrate and through the bath to its right-hand end where the sheets are lifted out of the bath and carried into the cooling compartment. The sheets remain in the bath 7 for 15 hours while the temperature of the sheets is progressively lowered from 500° C. to 350° C. This decrease in temperature, and the rate at which it occurs, is determined by the temperature of the successive heat exchangers 8, the first of which (the exchanger at the left-hand end) is kept at 500° C., and the temperature of each succeeding one of which is 37.5° C. less than that of the immediately preceding exchanger.

During the immersion of the sheets in the bath, sodium ions in surface layers of the glass become replaced by potassium ions and this ion exchange leads to the production of compressive stresses in the glass surface layers. During the period when the sheets are at the higher temperatures, the ion exchange progresses rapidly. Some reaction resulting in a buildup of the potassium ion concentration just adjacent the surfaces of the glass sheet may take place in this high-temperature region, but any tendency for this buildup to occur diminishes as the temperature decreases.

In the actual process described, a considerable part of the ion exchange occurs when the sheets are at the lower temperatures of the selected range.

The tempered sheets are slowly cooled in cooling compartment 3 and are subsequently removed from the racks 16 after having again entered the top compartment 14.

A similar treatment may be performed on vitrocrystalline sheets such as those obtained from a bath having the following composition percentages by weight:

| | |
|---|---|
| $SiO_2$ | 42.3% |
| $Al_2O_3$ | 31.2% |
| $Na_2O$ | 10.4% |
| $K_2O$ | 6.2% |
| CaO | 1.8% |
| $TiO_2$ | 7.4% |

| | |
|---|---|
| $As_2O_3$ | 0.7% |

Referring now to FIG. 2, there is shown part of a glass-drawing machine composed of a drawing chamber 18 in which a ribbon of glass is drawn upwardly from a supply of molten glass and is subsequently passed through a horizontal cooling chamber 20. A tank 21 is installed in this horizontal chamber.

The drawing chamber 18 is defined by spaced walls 23 and 14, and at the top of this chamber there is a bending roller 25 over which the glass ribbon travels to the horizontal chamber 20. The horizontal chamber, which is defined in part by bottom wall 26 and roof 27, contains horizontal rollers 28 for conveying the glass ribbon. The tank 21, which is defined in part by bottom wall 29 and end walls 30 and 31, holds a bath 32 consisting of a mixture of sodium and lithium salts. Within the tank there are heat exchangers 33, these exchangers being located near the bottom 29. Fluid streams at different temperatures circulate through the successive heat exchangers to maintain a suitable temperature gradient in the bath.

Two rollers 34 are placed within the tank and the glass ribbon passes under these rollers. The glass ribbon is thus caused to travel through the molten salt bath.

A typical operation of the installation according to FIG. 2 is as follows:

The speed of the glass ribbon and the dimensions of the tank 21 are such that each part of the ribbon remains immersed in the tank 21 for 10 minutes. The left-hand heat exchanger is kept at a temperature of 800° C. and the temperatures of the succeeding heat exchangers drop by 50° C. from one exchanger to the next so that the temperature of the bath near the exit end of the tank is 600° C., which temperature is above the annealing point of the glass. While any given portion of the glass ribbon is in the bath, lithium ions enter the surface layers of the glass and replace sodium ions, and this ion exchange continues to take place as the temperature of the glass decreases as above described.

After leaving the tank, the glass ribbon is bent over a roller 28 and then continues its horizontal movement through the chamber 20. In the next succeeding portion of the chamber, the ribbon continues to be cooled and downstream from the chemical tempering bath the ribbon is washed with water, to remove remaining traces of salt, and dried with hot air. The washing and drying stations are not shown.

It will be appreciated that the tempering effects can be varied by adjusting the temperatures of the heat exchangers.

As has already been mentioned, the ion exchange in a process according to the invention may take place between a glass body and a quantity of an exchange medium which is carried as a coating on the glass. The following is an example of this procedure:

A sheet of soda-lime glass was preheated to 490° C. and quickly immersed in and withdrawn from a bath of potassium nitrate at the same temperature. As a result of the dipping, the withdrawn sheet was entirely covered by a thin film of the potassium salt. On withdrawal from the bath, the sheet was cooled slowly from 490° to 350° C. over a period of 10 hours in a cooling chamber. The glass sheet was then rinsed and dried. As a result of the treatment, compressive stresses were set up in the surface layers of the glass.

In a comparative process, a glass sheet of the same composition as that treated in the above example was subjected to the same treatment except that the temperature of the sheet was kept at 490° C. for the whole 10-hour period. The compressive stresses set up in the surface layers of the glass were not much higher than the compressive stresses produced in the sheet treated in accordance with the invention and, in the same time, the tensile strength was much lower. Moreover, the sheet treated according to the invention was less susceptible to chemical attack by water than the sheet which was tempered under the constant temperature conditions.

In accordance with another aspect of the invention, it would be possible to achieve a comparable improvement by carrying out the ion diffusion operation in two or more separate stages with each stage being at a lower temperature than the immediately preceding one.

Another example concerns a soda-lime glass in the form of a sheet, 3 mm. in thickness. The sheet is immersed in a bath of $KNO_3$ at 530° C. Progressively the temperature of the bath is diminished to 350° C., at which temperature the sheet is taken out of the liquid bath. The process was completed in 24 hours. A similar treatment has been performed on a control sheet, but the temperature was now kept constant at 480° C., throughout the process.

In both cases the total potassium content introduced in the sheets was the same, and the gradients in concentration were not very different. It was however observed that in a thin surface layer of the control sheet, the total alkali metal ion content was now in excess of the initial sodium content. In a layer 5 microns in thickness this excess reached 4 percent. The compressive stresses obtained in both cases were comparable. The tensile strengths of an untreated sheet, of the control sheet and of the sheet treated in accordance with the invention were respectively 7, 45 and 65 kg./mm.$^2$.

In addition, when the sheet in accordance to the invention and the control sheet had been kept for 2 months in a moist atmosphere, the tensile strength of the control sheet had decreased to a value of 35 kg./mm.$^2$, but that of the sheet treated according to the invention remained constant. The presence of hydroxyl groups was observed in the control sheet.

Similar effects have been observed on bodies composed of vitrocrystalline material. In this case the ion exchange and the build up of an excess of alkali metal is mainly observed in the glassy phase of the material. It is found that the strength of the material is more improved by a treatment wherein the temperature of the ion exchange is decreased during the process. The enhanced chemical and physical properties of the glassy phase constitute also improvements of the whole vitrocrystalline body.

It will be understood that the above description of the present invention is susceptible to various modifications, changes and adaptations, and the same are intended to be comprehended within the meaning and range of equivalents of the appended claims.

I claim:

1. In a process of increasing the physical strength of a solid body of a glass or vitrocrystalline material capable of being chemically tempered by subjecting it to a chemical tempering of the low-temperature type involving the replacement of ions, initially present in the body, by larger ions initially present in a diffusion medium contacting the body and constituting a source of such larger ions while maintaining the temperature of the body below the annealing point of the material and placing the body at the start of the ion exchange at a temperature of at least 0.6 Tg, where Tg is the transformation temperature of the body material, for a time sufficiently short to prevent substantial relaxation of the stresses of the body, the improvement comprising decreasing the temperature of the body by at least 40° C. over the period during which the ion exchange occurs while maintaining the temperature within the range required for such exchange.

2. A process as defined in claim 1 wherein the body is of a soda-lime glass.

3. A process as defined in claim 1 wherein the chemical tempering involves an exchange of alkali metal ions.

4. A process as defined in claim 3 wherein the ion exchange involves the replacement of sodium ions originally present in the body by potassium ions.

5. A process as defined in claim 4 wherein the medium includes, as at least one ingredient, a molten potassium salt.

6. A process as defined in claim 1 wherein the tempering is carried out by passing the body through a mass of the diffusion medium and said step of decreasing the temperature is carried out by decreasing the temperature of the medium along the path of movement of the body.

7. A process as defined in claim 6 wherein the body is a ribbon of drawn glass which is caused to pass through the medium.

8. A process as defined in claim 7 wherein the ribbon of glass is caused to pass continuously into the medium from the drawing zone of a glass-drawing machine.

9. A process as defined in claim 1 wherein the diffusion medium is in the form of a coating disposed on the body during the ion exchange.

10. A process as defined in claim 1 comprising the preliminary step of preheating the body before bringing it into contact with the medium, the medium with which the body is initially brought into contact being at the temperature at which the ion exchange is to commence.

11. A body of vitreous or vitrocrystalline material strengthened by being subjected to the process as defined in claim 1.

* * * * *